(12) United States Patent
Yoo et al.

(10) Patent No.: US 11,527,906 B2
(45) Date of Patent: Dec. 13, 2022

(54) LIQUID DISPENSER FOR ANIMALS

(71) Applicant: LG ELECTRONICS INC., Seoul (KR)

(72) Inventors: Hyunsun Yoo, Seoul (KR); Jaehung Chun, Seoul (KR); Yousook Eun, Seoul (KR); Joogyeom Kim, Seoul (KR); Sungkyung Kim, Seoul (KR); Myongsun Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 356 days.

(21) Appl. No.: 16/571,075

(22) Filed: Sep. 14, 2019

(65) Prior Publication Data

US 2020/0091756 A1 Mar. 19, 2020

Related U.S. Application Data

(60) Provisional application No. 62/733,393, filed on Sep. 19, 2018.

(30) Foreign Application Priority Data

Nov. 1, 2018 (KR) .................. 10-2018-0133062
May 22, 2019 (KR) .................. 10-2019-0059786

(51) Int. Cl.
  *H02J 7/00* (2006.01)
  *H02J 7/02* (2016.01)
  (Continued)

(52) U.S. Cl.
  CPC .............. *H02J 7/025* (2013.01); *A01K 7/005* (2013.01); *A01K 7/025* (2013.01); *H02J 7/0044* (2013.01)

(58) Field of Classification Search
  CPC ...................................................... H02J 7/025
  See application file for complete search history.

(56) References Cited

U.S. PATENT DOCUMENTS 1,512,629 A  10/1924 Mueller et al.
2,103,653 A  12/1937 Weil
(Continued)

FOREIGN PATENT DOCUMENTS

CA  2082083  5/1994
CA  2587229  5/2006
(Continued)

OTHER PUBLICATIONS

United States Office Action dated Oct. 5, 2021 issued in co-pending related U.S. Appl. No. 16/571,074.
(Continued)

*Primary Examiner* — Robert Grant
(74) *Attorney, Agent, or Firm* — KED & Associates, LLP

(57) ABSTRACT

A pet water dispenser may include a water tank including a bottom plate and at least one wall extending from the bottom plate, at least one electronic device provided in a water tank electronic component or chamber under the bottom plate, and a power supply device or assembly to supply electric power to the water tank electronic component. The power supply assembly may include a docking station provided under the bottom plate and to which external power is applied, an auxiliary battery provided in the inner assembly, a wireless power transfer device, and a reverse wireless power transfer device. The wireless power transfer device and the reverse wireless power transfer device may be connected to the auxiliary battery and the docking station.

16 Claims, 8 Drawing Sheets

(51) Int. Cl.
*A01K 7/00* (2006.01)
*A01K 7/02* (2006.01)

(56) References Cited

U.S. PATENT DOCUMENTS

| | | |
|---|---|---|
| 2,510,446 A | 6/1950 | Weil |
| 3,076,435 A | 2/1963 | Seymour |
| 3,303,824 A | 2/1967 | Anderson |
| 3,441,003 A | 4/1969 | Du Mond et al. |
| D221,755 S | 9/1971 | Johnson |
| 3,691,787 A | 9/1972 | Kaufmann |
| 4,100,885 A | 7/1978 | Kapplinger |
| 4,133,456 A | 1/1979 | Corini |
| 4,286,546 A | 9/1981 | Moore |
| 4,561,384 A | 12/1985 | Liff |
| 4,640,226 A | 2/1987 | Liff |
| 4,932,561 A | 6/1990 | Boxall |
| 5,031,689 A | 7/1991 | Jones et al. |
| 5,105,771 A | 4/1992 | Schafer |
| 5,140,134 A | 8/1992 | Reusche et al. |
| 5,174,245 A | 12/1992 | Bishop |
| 5,205,242 A | 4/1993 | Kasselman |
| 5,209,069 A | 5/1993 | Newnan |
| 5,345,063 A | 9/1994 | Reusche et al. |
| 5,601,199 A | 2/1997 | Marty |
| 5,699,669 A | 12/1997 | Gebhard |
| 5,791,287 A | 8/1998 | Gruber |
| 5,799,609 A | 9/1998 | Burns et al. |
| 5,845,605 A | 12/1998 | Malamphy |
| 5,884,582 A | 3/1999 | Duckworth |
| 6,230,653 B1 | 5/2001 | Tobin |
| 6,460,483 B1 | 10/2002 | Northrop et al. |
| 6,622,657 B2 | 9/2003 | Northrop et al. |
| 6,705,540 B2 | 3/2004 | Koshiyama et al. |
| 6,848,392 B1 | 2/2005 | Kreutzer, Jr. |
| 7,089,881 B2 | 8/2006 | Plante |
| 7,270,082 B2 | 9/2007 | Plante |
| 7,549,395 B2 | 6/2009 | Stenberg |
| 7,600,486 B2 | 10/2009 | Ellis |
| 7,743,698 B2 | 6/2010 | Muir et al. |
| 7,823,538 B1 | 11/2010 | Merager |
| 8,117,991 B1 | 2/2012 | Civitillo |
| 8,210,447 B2 | 7/2012 | Cohen |
| 8,387,566 B2 | 3/2013 | Graves et al. |
| 8,770,147 B2 | 7/2014 | Rowe |
| 8,770,148 B2 | 7/2014 | Lipscomb et al. |
| 9,035,222 B2 | 5/2015 | Alexander |
| D738,579 S | 9/2015 | Owens et al. |
| D755,449 S | 5/2016 | Cornwell, Jr. et al. |
| 9,497,930 B2 | 11/2016 | Lipscomb et al. |
| 1,243,126 A1 | 10/2017 | Ziener |
| D819,898 S | 6/2018 | Poisson et al. |
| 10,165,753 B1 | 1/2019 | Huang |
| 11,154,034 B2 | 10/2021 | Youn et al. |
| 11,160,250 B2 | 11/2021 | Yoo et al. |
| 2002/0020673 A1 | 2/2002 | Nohren et al. |
| 2003/0115902 A1 | 6/2003 | Busick et al. |
| 2003/0140864 A1 | 7/2003 | Wenstrand |
| 2003/0213437 A1 | 11/2003 | Norris |
| 2005/0166853 A1 | 8/2005 | Plante |
| 2006/0174838 A1 | 8/2006 | Plante |
| 2006/0231040 A1 | 10/2006 | Bast et al. |
| 2006/0288947 A1 | 12/2006 | Perlsweig et al. |
| 2007/0045159 A1 | 3/2007 | Lee |
| 2007/0095297 A1 | 5/2007 | Boyd |
| 2007/0199512 A1 | 8/2007 | Ellis |
| 2007/0227456 A1 | 10/2007 | Borey |
| 2008/0078330 A1 | 4/2008 | McCallum et al. |
| 2008/0169249 A1 | 7/2008 | Ter Stege |
| 2008/0190374 A1 | 8/2008 | Farris |
| 2008/0257272 A1 | 10/2008 | Bolda |
| 2009/0126641 A1 | 5/2009 | Anderson et al. |
| 2009/0218985 A1 | 9/2009 | Hallett |
| 2010/0095897 A1 | 4/2010 | Rowe |
| 2010/0276508 A1 | 11/2010 | Davies |
| 2010/0300366 A1 | 12/2010 | Lipscomb et al. |
| 2011/0067638 A1 | 3/2011 | Lipscomb et al. |
| 2011/0102945 A1 | 5/2011 | Isono et al. |
| 2011/0214613 A1 | 9/2011 | Diamond |
| 2011/0226470 A1 | 9/2011 | Latrille et al. |
| 2011/0259273 A1 | 10/2011 | Lipscomb et al. |
| 2012/0017839 A1 | 1/2012 | Veness et al. |
| 2012/0111280 A1 | 5/2012 | Shin et al. |
| 2012/0216751 A1 | 8/2012 | Rowe |
| 2013/0087102 A1 | 4/2013 | Lipscomb et al. |
| 2013/0092090 A1 | 4/2013 | McCallum |
| 2013/0175802 A1 | 7/2013 | Breau et al. |
| 2013/0192529 A1 | 8/2013 | Kruger et al. |
| 2013/0200064 A1 | 8/2013 | Alexander |
| 2013/0228132 A1 | 9/2013 | Lipscomb et al. |
| 2013/0255280 A1 | 10/2013 | Murphy et al. |
| 2014/0033984 A1 | 2/2014 | Li et al. |
| 2014/0053781 A1 | 2/2014 | Lewis |
| 2014/0076242 A1 | 3/2014 | Ho |
| 2014/0165607 A1 | 6/2014 | Alexander |
| 2014/0251223 A1 | 9/2014 | Rowe et al. |
| 2014/0353335 A1 | 12/2014 | Van Diepen |
| 2015/0135728 A1 | 5/2015 | Swanson et al. |
| 2015/0189862 A1 | 7/2015 | Lipscomb |
| 2015/0196157 A1 | 7/2015 | Swisth |
| 2015/0276204 A1 | 10/2015 | Ray |
| 2015/0313180 A1 | 11/2015 | Lipscomb et al. |
| 2015/0353335 A1 | 12/2015 | Breault |
| 2016/0000037 A1 | 1/2016 | Lipscomb et al. |
| 2016/0099599 A1 | 4/2016 | Ho et al. |
| 2016/0113249 A1 | 4/2016 | Kuo |
| 2016/0118179 A1 | 4/2016 | Park et al. |
| 2016/0159633 A1 | 6/2016 | Diffenderfer |
| 2016/0286757 A1* | 10/2016 | Armstrong .............. A01K 7/02 |
| 2016/0287363 A1 | 10/2016 | Miller |
| 2017/0245465 A1* | 8/2017 | Oates .................. B65D 21/0234 |
| 2017/0255186 A1 | 9/2017 | Ryznar et al. |
| 2018/0054073 A1 | 2/2018 | Olson et al. |
| 2018/0160648 A1 | 6/2018 | Goh |
| 2018/0177325 A1* | 6/2018 | Lyons .................. A47J 31/005 |
| 2019/0075755 A1 | 3/2019 | Imaizumi et al. |
| 2019/0140471 A1 | 5/2019 | Johanski et al. |
| 2019/0162460 A1 | 5/2019 | Oh |
| 2019/0227580 A1 | 7/2019 | von der Assen et al. |
| 2019/0239476 A1 | 8/2019 | Mai et al. |
| 2019/0239491 A1 | 8/2019 | Yu et al. |
| 2019/0357747 A1 | 11/2019 | Keiler, III |
| 2020/0303971 A1 | 9/2020 | Hall et al. |
| 2020/0337266 A1 | 10/2020 | Yu et al. |
| 2020/0355751 A1 | 11/2020 | Swaans et al. |

FOREIGN PATENT DOCUMENTS

| | | |
|---|---|---|
| CH | 711714 | 1/2022 |
| CN | 2322412 | 6/1999 |
| CN | 2351955 | 12/1999 |
| CN | 1701206 | 11/2005 |
| CN | 2776044 | 5/2006 |
| CN | 1870903 | 11/2006 |
| CN | 200994393 | 12/2007 |
| CN | 200994394 | 12/2007 |
| CN | 201365463 | 12/2009 |
| CN | 201422313 | 3/2010 |
| CN | 201530253 | 7/2010 |
| CN | 101790970 | 8/2010 |
| CN | 201541568 | 8/2010 |
| CN | 101816289 | 9/2010 |
| CN | 101841191 | 9/2010 |
| CN | 102072468 | 5/2011 |
| CN | 102480927 | 5/2012 |
| CN | 102600661 | 7/2012 |
| CN | 202310894 | 7/2012 |
| CN | 102934044 | 2/2013 |
| CN | 202722224 | 2/2013 |
| CN | 202873523 | 4/2013 |
| CN | 203136752 | 8/2013 |
| CN | 203544552 | 4/2014 |
| CN | 203618522 | 6/2014 |
| CN | 103917147 | 7/2014 |

(56) References Cited

FOREIGN PATENT DOCUMENTS

| CN | 103931515 | 7/2014 |
|---|---|---|
| CN | 203913286 | 11/2014 |
| CN | 204707695 | 10/2015 |
| CN | 204722018 | 10/2015 |
| CN | 105265331 | 1/2016 |
| CN | 205005702 | 2/2016 |
| CN | 105792644 | 7/2016 |
| CN | 205431490 | 8/2016 |
| CN | 105923696 | 9/2016 |
| CN | 205682161 | 11/2016 |
| CN | 106172064 | 12/2016 |
| CN | 106212310 | 12/2016 |
| CN | 205830734 | 12/2016 |
| CN | 106332801 | 1/2017 |
| CN | 205884322 | 1/2017 |
| CN | 106787233 | 5/2017 |
| CN | 206142936 | 5/2017 |
| CN | 206227319 | 6/2017 |
| CN | 106962218 | 7/2017 |
| CN | 206314381 | 7/2017 |
| CN | 107041318 | 8/2017 |
| CN | 107124043 | 9/2017 |
| CN | 107259458 | 10/2017 |
| CN | 107509653 | 12/2017 |
| CN | 206699096 | 12/2017 |
| CN | 206760412 | 12/2017 |
| CN | 206760441 | 12/2017 |
| CN | 107568092 | 1/2018 |
| CN | 206851699 | 1/2018 |
| CN | 107660756 | 2/2018 |
| CN | 206949206 | 2/2018 |
| CN | 107821202 | 3/2018 |
| CN | 107897027 | 4/2018 |
| CN | 207268238 | 4/2018 |
| CN | 107969351 | 5/2018 |
| CN | 207411173 | 5/2018 |
| CN | 207443927 | 6/2018 |
| CN | 207519400 | 6/2018 |
| CN | 108271728 | 7/2018 |
| CN | 108353810 | 8/2018 |
| CN | 108377928 | 8/2018 |
| CN | 108464253 | 8/2018 |
| CN | 207740217 | 8/2018 |
| CN | 207803161 | 9/2018 |
| CN | 207870035 | 9/2018 |
| CN | 109997713 | 7/2019 |
| DE | 20 2016 107 252 | 3/2018 |
| EP | 0 894 430 | 2/1999 |
| EP | 1 188 995 | 3/2002 |
| EP | 1 566 099 | 8/2005 |
| EP | 3 315 022 | 5/2018 |
| EP | 3 520 607 | 8/2019 |
| FR | 2 726 452 | 5/1996 |
| GB | 2 458 173 | 9/2009 |
| GB | 2574921 | 12/2019 |
| JP | H05-118725 | 5/1993 |
| JP | H07-269800 | 10/1995 |
| JP | 2012-188163 | 10/2012 |
| JP | 3200546 | 10/2015 |
| JP | 2017-148018 | 8/2017 |
| JP | 2018-057340 | 4/2018 |
| KR | 10-0835557 | 6/2008 |
| KR | 10-2010-0046615 | 5/2010 |
| KR | 10-1116332 | 3/2012 |
| KR | 10-2013-0136123 | 12/2013 |
| KR | 10-2014-0042949 | 4/2014 |
| KR | 20-0475039 | 11/2014 |
| KR | 10-2017-0003154 | 1/2017 |
| KR | 10-2017-0017718 | 2/2017 |
| KR | 10-1825334 | 2/2018 |
| KR | 10-1898661 | 9/2018 |
| RU | 2650560 | 4/2018 |
| TW | 201641007 | 12/2016 |
| TW | I 574614 | 3/2017 |
| WO | WO 2009/016604 | 2/2009 |
| WO | WO 2010/138799 | 12/2010 |
| WO | WO 2011/035320 | 3/2011 |
| WO | WO 2013/012943 | 1/2013 |
| WO | WO 2014/209159 | 12/2014 |
| WO | WO 2017/185053 | 10/2017 |

OTHER PUBLICATIONS

Chinese Office Action dated Mar. 30, 2021 issued in CN Application No. 201910886714.X.
United States Office Action dated May 11, 2021 issued in co-pending related U.S. Appl. No. 16/571,093.
Chinese Office Action issued in Application No. 201910887007.2 dated Apr. 20, 2021.
Chinese Office Action issued in Application No. 201910886974.7 dated Apr. 20, 2021.
Chinese Office Action issued in Application No. 201910886711.6 dated Apr. 20, 2021.
Chinese Office Action issued in Application No. 201910889081.8 dated Apr. 20, 2021.
Chinese Office Action issued in Application No. 201910888688.4 dated Apr. 21, 2021.
Chinese Office Action issued in Application No. 201910886539.4 dated Apr. 22, 2021.
Chinese Office Action issued in Application No. 201910889318.2 dated Apr. 22, 2021.
Chinese Office Action issued in Application No. 201910888721.3 dated Apr. 22, 2021.
Chinese Office Action issued in Application No. 201910888102.4 dated Apr. 26, 2021.
Chinese Office Action dated May 21, 2021 issued in CN Application No. 201910888661.5.
Chinese Office Action dated May 10, 2021 issued in CN Application No. 201910888718.1.
Chinese Office Action dated Apr. 1, 2021 issued in CN Application No. 201910886305.X.
Chinese Office Action dated Apr. 9, 2021 issued in CN Application No. 201910886526.7.
European Search Report dated Apr. 9, 2020 issued in EP Application No. 19198174.5.
United States Office Action dated Jun. 2, 2020 issued in co-pending related U.S. Appl. No. 16/574,259.
European Search Report dated Feb. 27, 2020 issued in Application No. 19198292.5.
European Search Report dated Feb. 27, 2020 issued in Application No. 19198298.2.
European Search Report dated Feb. 3, 2020 issued in Application No. 19198173.7.
European Search Report dated Feb. 3, 2020 issued in Application No. 19198182.8.
European Search Report dated Feb. 3, 2020 issued in Application No. 19198183.6.
European Search Report dated Feb. 3, 2020 issued in Application No. 19198184.4.
European Search Report dated Feb. 3, 2020 issued in Application No. 19198186.9.
European Search Report dated Feb. 3, 2020 issued in Application No. 19198202.4.
European Search Report dated Feb. 10, 2020 issued in Application No. 19198265.1.
European Search Report dated Apr. 17, 2020 issued in EP Application No. 19198180.2.
European Search Report dated Apr. 17, 2020 issued in EP Application No. 19198307.1.
European Search Report dated Apr. 20, 2020 issued in EP Application No. 19198310.5.
European Search Report dated Apr. 20, 2020 issued in EP Application No. 19198368.3.
United States Office Action dated Apr. 27, 2021 issued in co-pending related U.S. Appl. No. 16/569,841.
United States Office Action dated Apr. 27, 2021 issued in co-pending related U.S. Appl. No. 16/574,418.

(56) References Cited

OTHER PUBLICATIONS

Chinese Office Action dated May 17, 2021 issued in CN Application No. 201910887029.9.
Chinese Office Action dated May 17, 2021 issued in CN Application No. 201910889360.4.
Chinese Office Action dated May 18, 2021 issued in CN Application No. 201910888671.9.
European Search Report dated Apr. 23, 2020 issued in EP Application No. 19198303.0.
Chinese Office Action issued in Application No. 201910888224.3 dated Apr. 12, 2021.
Chinese Office Action issued in Application No. 201910888611.7 dated Apr. 12, 2021.
Chinese Office Action issued in Application No. 201910888695.4 dated Apr. 16, 2021.
European Search Report dated Feb. 14, 2020 issued in Application No. 19198187.7.
European Search Report dated Feb. 14, 2020 issued in Application No. 19198196.8.
European Search Report dated Feb. 19, 2020 issued in Application No. 19198191.9.
European Search Report dated Feb. 19, 2020 issued in Application No. 19198200.8.
European Search Report dated Feb. 3, 2020 issued in EP Application No. 19198170.3.
European Search Report dated Feb. 24, 2020 issued in EP Application No. 19198289.1.
Chinese Office Action dated Mar. 31, 2021 issued in CN Application No. 201910886533.7.
Chinese Office Action dated May 17, 2021 issued in CN Application No. 201910889361.9.
United States Office Action dated Mar. 30, 2021 issued in co-pending related U.S. Appl. No. 16/571,090.
United States Office Action dated Mar. 24, 2022 issued in co-pending related U.S. Appl. No. 16/571,089.
United States Office Action dated Feb. 1, 2022 issued in co-pending related U.S. Appl. No. 16/574,237.
United States Office Action dated Dec. 6, 2021 issued in co-pending related U.S. Appl. No. 16/569,827.
Chinese Office Action dated Nov. 10, 2021 issued in CN Application No. 201910886533.7.
Chinese Office Action dated Nov. 10, 2021 issued in CN Application No. 201910886714.X.
United States Office Action dated Feb. 11, 2022 issued in co-pending related U.S. Appl. No. 16/574,322.
United States Office Action dated Dec. 10, 2021 issued in co-pending related U.S. Appl. No. 16/571,075.
Dong, CN108464253A Machine Translation Description, Aug. 31, 2018, obtained Jan. 13, 2022 (Year: 2018).
United States Office Action dated Mar. 14, 2022 issued in co-pending related U.S. Appl. No. 16/570,310.
United States Office Action dated Mar. 17, 2022 issued in co-pending related U.S. Appl. No. 16/574,581.
United States Office Action dated May 19, 2022 issued in co-pending related U.S. Appl. No. 16/569,827.
United States Office Action dated Jun. 2, 2022 issued in co-pending related U.S. Appl. No. 16/570,279.
United States Office Action dated Jun. 15, 2022 issued in co-pending related U.S. Appl. No. 16/569,908.
Chinese Notice of Allowance dated Apr. 8, 2022 issued in CN Application No. 201910888611.7.
United States Office Action dated Jun. 23, 2022 issued in co-pending related U.S. Appl. No. 16/574,368.
United States Office Action dated Jul. 5, 2022 issued in co-pending related U.S. Appl. No. 16/574,240.
United States Office Action dated Jul. 7, 2022 issued in co-pending related U.S. Appl. No. 16/574,474.
United States Office Action dated Jul. 29, 2022 issued in co-pending related U.S. Appl. No. 16/574,322.
U.S. Appl. No. 16/574,219, filed Sep. 18, 2019.
U.S. Appl. No. 16/574,240, filed Sep. 18, 2019.
U.S. Appl. No. 16/574,237, filed Sep. 18, 2019.
U.S. Appl. No. 16/574,312, filed Sep. 18, 2019.
U.S. Appl. No. 16/574,349, filed Sep. 18, 2019.
U.S. Appl. No. 16/574,322, filed Sep. 18, 2019.
U.S. Appl. No. 16/574,368, filed Sep. 18, 2019.
U.S. Appl. No. 16/574,474, filed Sep. 18, 2019.
U.S. Appl. No. 16/574,581, filed Sep. 18, 2019.
U.S. Appl. No. 16/571,245, filed Sep. 16, 2019.
U.S. Appl. No. 16/571,093, filed Sep. 14, 2019.
U.S. Appl. No. 16/571,089, filed Sep. 14, 2019.
U.S. Appl. No. 16/571,076, filed Sep. 14, 2019.
U.S. Appl. No. 16/571,074, filed Sep. 14, 2019.
U.S. Appl. No. 16/571,075, filed Sep. 14, 2019.
U.S. Appl. No. 16/571,073, filed Sep. 14, 2019.
U.S. Appl. No. 16/570,310, filed Sep. 13, 2019.
U.S. Appl. No. 16/570,279, filed Sep. 13, 2019.
U.S. Appl. No. 16/569,827, filed Sep. 13, 2019.
U.S. Appl. No. 16/569,908, filed Sep. 13, 2019.
United States Office Action dated Aug. 29, 2022 issued in co-pending related U.S. Appl. No. 16/571,245.
Chinese Notice of Allowance dated Jul. 11, 2022 issued in CN Application No. 201910886305.X.
United States Office Action dated Sep. 19, 2022 issued in co-pending related U.S. Appl. No. 16/569,827.
United States Office Action dated Oct. 11, 2022 issued in co-pending related U.S. Appl. No. 16/570,279.
United States Office Action dated Oct. 13, 2022 issued in co-pending related U.S. Appl. No. 16/571,089.
Chinese Notice of Allowance dated Aug. 31, 2022 issued in CN Application No. 201910889318.2.
Chinese Office Action dated Sep. 21, 2022 issued in CN Application No. 201910888224.3.

* cited by examiner

LIQUID DISPENSER FOR ANIMALS

CROSS-REFERENCE TO RELATED APPLICATION(S)

This application claims priority under 35 U.S.C. § 119 to U.S. Provisional Application No. 62/733,393 filed on Sep. 19, 2018 and Korean Application No. 10-2018-0133062 filed on Nov. 1, 2018, and 10-2019-0059786 filed on May 22, 2019, whose entire disclosure(s) is/are hereby incorporated by reference.

BACKGROUND

1. Field

A liquid dispenser to supply liquid to an animal, e.g., a pet, is disclosed herein.

2. Background

European Patent No. 3315022 and U.S. Publication No. 2014/0053781 disclose drinking bowls for pets. However, such drinking bowls have various disadvantages, which the present disclosure solves.

The above references are incorporated by reference herein where appropriate for appropriate teachings of additional or alternative details, features and/or technical background.

DETAILED DESCRIPTION

Figure 1:
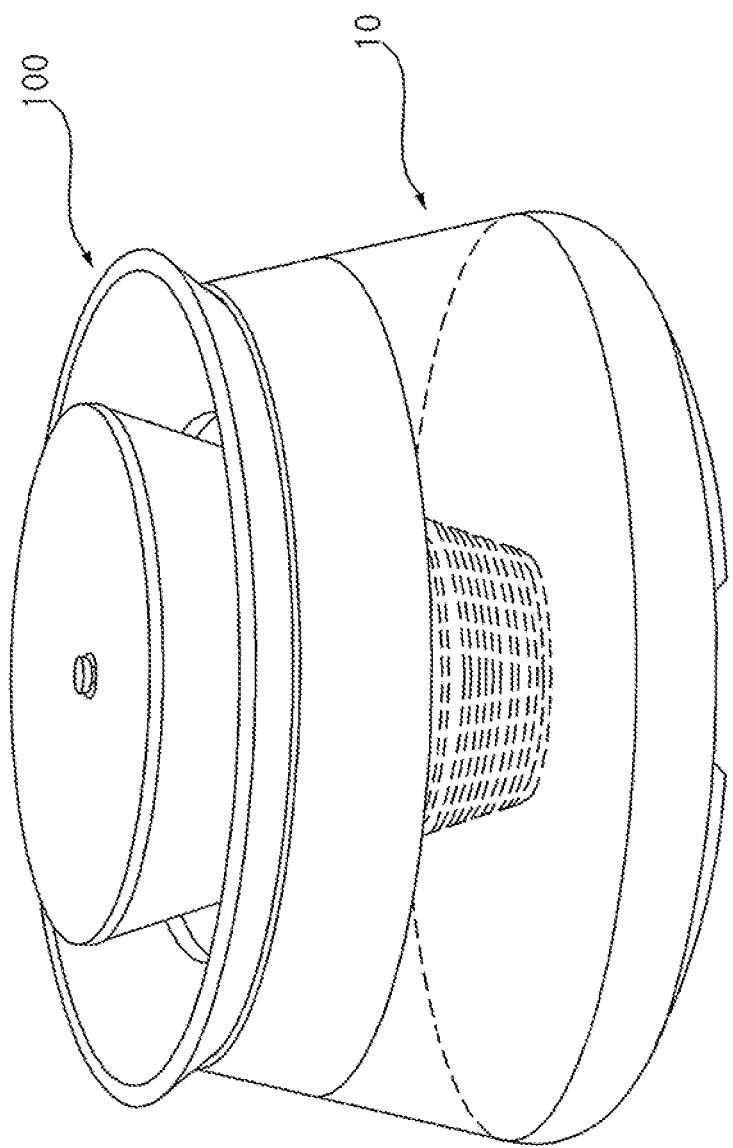
FIG. 1 is a perspective view showing a pet water dispenser according to an embodiment.
Figure 2:
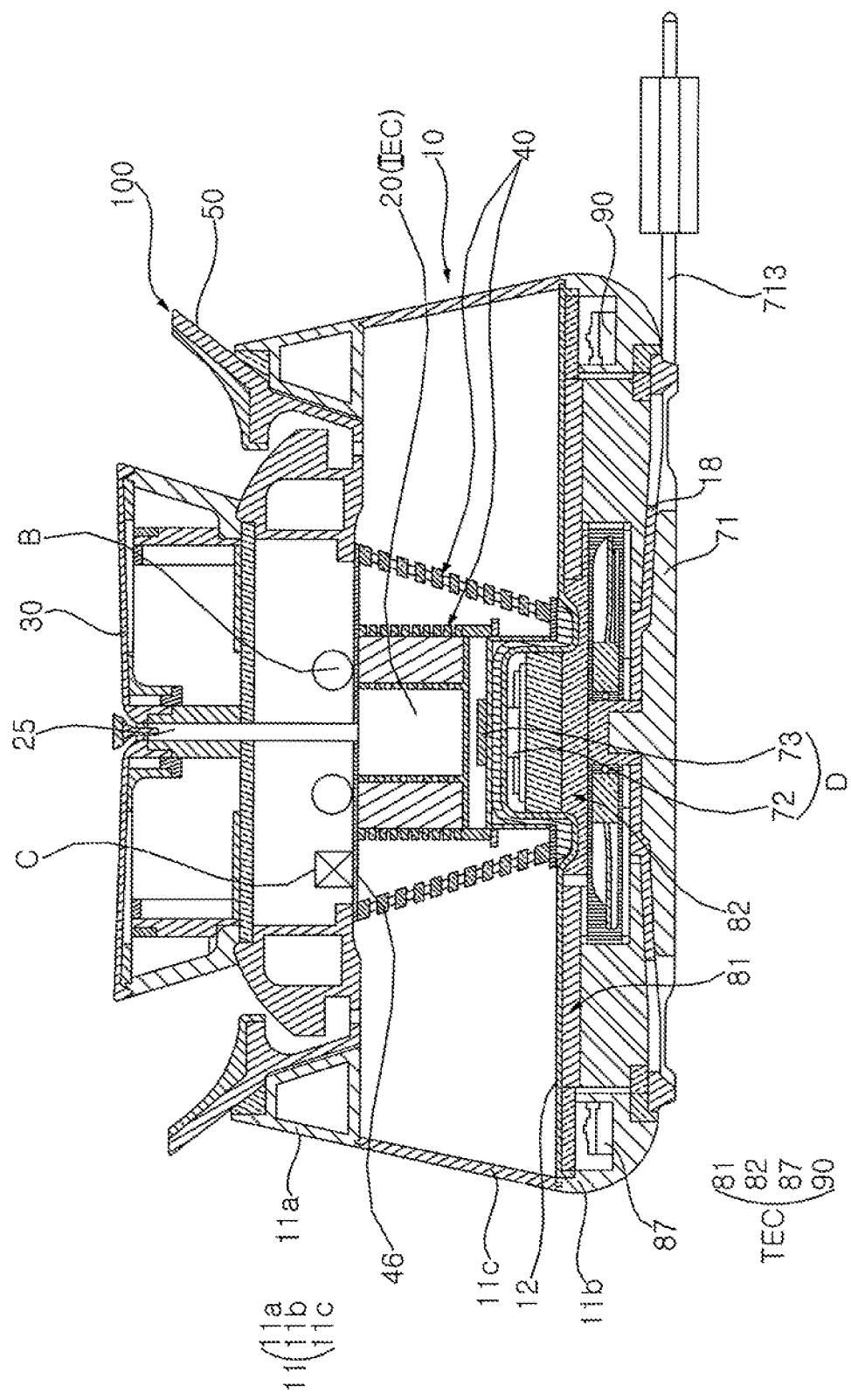
FIG. 2 is a sectional view of the pet water dispenser shown in FIG. 1.

Referring to FIG. 1, the pet water dispenser according to an embodiment may include an inner assembly 100 detachably inserted into a water tank or storage chamber 10 to supply water from the water tank 10 to an outside. Referring to FIG. 2, the pet water dispenser may include the water tank 10 in which water is stored, a pump 20 installed or located in the water tank 10 to pump water stored in the water tank 10, a water supply pipe 25 connected to the pump 20, and a water supply plate or upper plate 30 over which water supplied from the water supply pipe 25 flows. The pump 20, the water supply pipe 25, the water supply plate 30, and the water guide 50 may be part of the inner assembly 100. The pump 20 may be an electronic device included in an inner electric component or chamber (IEC).

Between the water tank 10 and the water supply plate 30, a water guide or a water receiver 50 to catch water dropped from the water supply plate 30 and to guide the water back to the water storage tank 10 may be provided. The water guide 50 may also be referred to as a drip tray or splash guard. Accordingly, the water in the water tank 10 can be circulated through the pump 20, the water supply plate 30, the water guide 50, and back down to the water tank 10. In addition, a filter assembly 40 including at least one filter may be included in the inner assembly 100 to filter foreign substances contained in the water before the water stored in the water tank 10 flows into the pump 20.

The water tank 10 may include a wall 11 forming sides of the water tank 10 and a bottom plate 12 provided as a lower surface. An upper wall 11a and a container support 11b may be formed on upper and lower sides of a main or middle wall 11c, respectively. The bottom plate 12 may be provided between the main wall 11c and the container support 11b. The main wall 11c, the upper wall 11a, and the bottom plate 12 may define an area or container where water is stored, while the container support 11b may extend past the bottom plate 12 to partially define a base, or a space below the bottom plate 12 that is shielded from water. The water tank 10 may be formed in a cylindrical or truncated cone shape with a diameter that recedes from the bottom plate 12 to the top of the upper wall 11a, but may be formed in various shapes without being limited thereto.

The container support 11b may further include or be coupled to a base plate 18 spaced downward from the bottom plate 12. The container where water is stored may alternatively be referred to as a tank, and the enclosed space below the container defined by the container support 11b and a base plate 18 may be referred to as a base of the tank.

Water tank electronic components (TEC) may be provided in a space formed by the bottom plate 12, the base plate 18, and the container support 11b. The tank electronic components TEC may include electronic devices such as a thermoelectric element 81, a motor 82, a proximity sensor 87, and a power source sensor 90. The thermoelectric element 81 may be a Peltier device or a thermoelectric cooler. The thermoelectric element 81 may be used to heat or cool liquid in the container of the water tank 10.

The thermoelectric element 81 may be provided below the bottom plate 12 to control a temperature of the water stored in the water tank 10. The bottom plate 12 may be made of a material having a high thermal conductivity or metal (e.g., stainless steel). The motor 82 may be positioned near a center of the thermoelectric element 81 to rotate a fan and dissipate heat generated in the thermoelectric element 81. The proximity sensor 87 may be accommodated in the container support 11b to detect whether a pet is approaching the pet water dispenser within a predetermined distance range. The power supply sensor 90 may be accommodated in the container support 11b to control or sense a power supply operation of the pet water dispenser.

However, the TEC is not limited to the configurations listed in the above specification and published in the drawings. For example, the TEC may further include a heat sink provided in a center of the thermoelectric element 81 to help dissipate heat and/or a water level sensor provided in a mounting space of the container support 11b. Details of the TEC may be found in U.S. application Ser. No. 16/571,074 filed on Sep. 14, 2019 and U.S. application Ser. No. 16/659, 841 filed on Sep. 13, 2019, the entire contents of which are incorporated by reference herein.

The inner assembly 100 may be inserted into the water tank 10 to be provided above the bottom plate 12 and may supply water from the water tank 10 to the water supply plate 30 by using the filter assembly 40, the pump 20, and the water supply pipe 25. The water supply pipe 25 may communicate with a hole in the center of the water supply plate 30 through which water is discharged.

In addition, the inner assembly 100 may include inner electronic components (IEC). For example, the pump 20 may be an IEC. However, the IEC is not limited to the configurations listed in the above specification and illustrated in the drawings. Both the IEC and TEC may be or include electric components or devices that require power to operate.

Referring FIG. 3, "upward" power transmission in which electric power (or power) is transmitted from an external commercial power source (or external power supply) to the IEC in the inner assembly 100 will be described. A "downward" power transmission will be described later.

External power may be supplied to a docking station 71 via an electrical wire 713. The docking station 71 may be electrically coupled to a bottom of the base plate 18 via, e.g., terminals or electrodes. Details of the connection between the docking station 71 and the base plate 18 may be found in U.S. application Ser. No. 16/571,089 filed on Sep. 14, 2019, the entire contents of which are incorporated by reference herein.

The docking station 71 may have a power system configuration in which external power is directly applied by connecting the electrical wire 713, which may be drawn from the docking station 71, to the external commercial power source (e.g., socket). External power may be applied to the docking station 71, and in step S11, the docking station 71 may be connected to the water tank 10. A manner in which external power is applied to the docking station 71 may not be limited to the structure described in the above description or drawings. For example, external power may be applied to the docking station 71 via wireless power transfer.

The TEC may be electrically connected to the docking station 71 and may be operated by receiving external power by the docking station 71. In step S12, the external power applied to the docking station 71 may be supplied through the base plate 18 to operate the TEC.

The external power applied through the docking station 71 may then be transferred to the inner assembly 100 by a wireless power transmission device or assembly D. The wireless power transmission device D may include a first wireless power transfer device 72 (e.g., a wireless power transmitter and/or transceiver) and a second wireless power transfer device 73 (e.g., a wireless power receiver and/or transceiver) to wirelessly transmit power via wireless power transmission. In the "upward" or "normal" power transmission exemplified in FIG. 3, the first and second wireless power transfer devices may be a wireless power transmitter and receiver, respectively.

The wireless power transmitter 72 may be provided under the bottom plate 12 and electrically connected to the docking station 71. In step S13, power from the docking station 71 may be applied to the wireless power transmitter 72 (WPT 72).

The wireless power receiver 73 may be arranged in the inner assembly 100 to have a position aligning or corresponding with a position of the wireless power transmitter 72. When power is applied to the wireless power transmitter 72 connected to the docking station 71, the wireless power transmitter 72 may generate an electromagnetic field, and a current may be induced in the wireless power receiver 73 from the electromagnetic field. In step S14, power is transmitted from the wireless power transmitter 72 to the wireless power receiver 73 (WPR 73).

The IEC may be electrically connected to the wireless power receiver 73. In step S15, power may be transmitted from the wireless power receiver 73 to the IEC to operate the IEC.

In addition, an auxiliary battery B provided in the inner assembly 100 may be electrically connected to the wireless power receiver 73, and the wireless power receiver 73 may charge the auxiliary battery B. In step S16, a control unit or controller C may check whether the auxiliary battery B is fully charged. If the controller determines that the auxiliary battery B is not fully charged, in step S17, the wireless power receiver 73 may transmit power to the auxiliary battery B to charge the auxiliary battery B.

Figure 3:
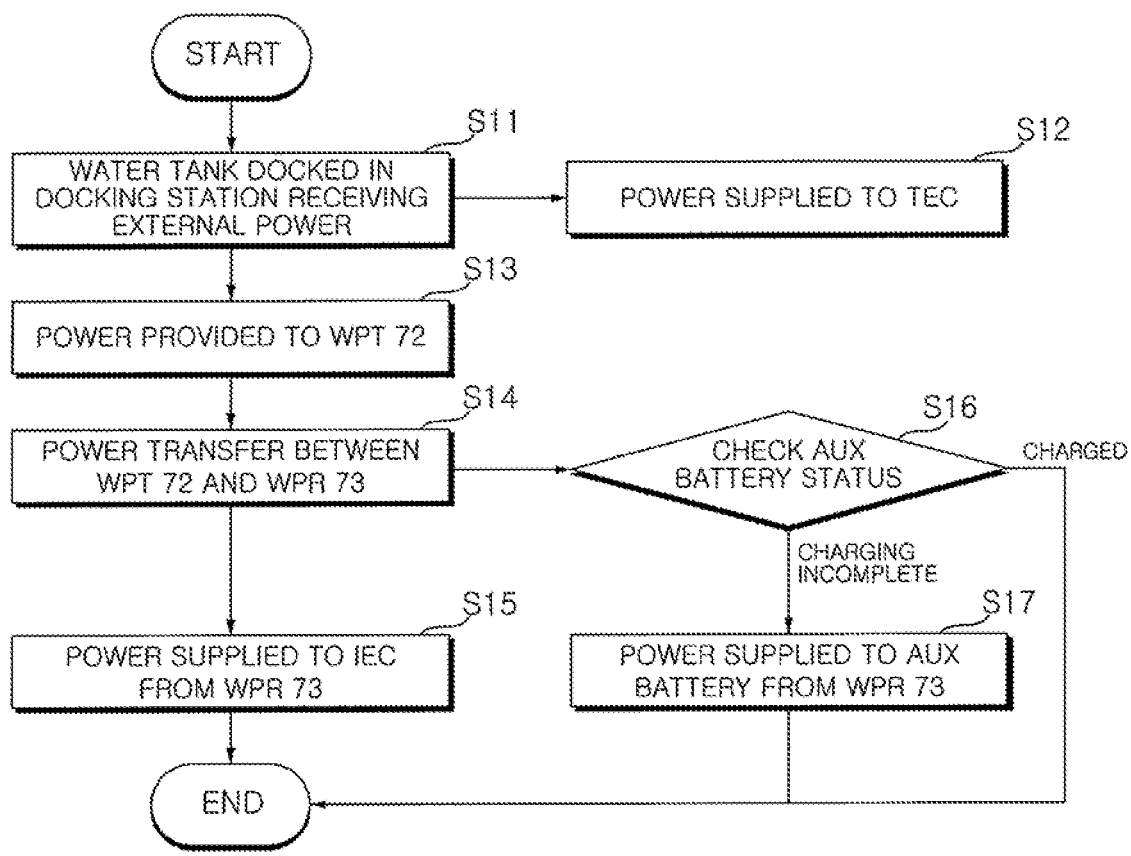
FIG. 3 is a flowchart showing a process in which external power is delivered to a pet water dispenser via a docking station.

Referring to FIG. 3, "downward" or "reverse" power transmission of electric power (or power) may be transmitted from the inner assembly 100 to the TEC in the base plate 18. The pet water dispenser according to an embodiment may be capable of bi-directional power transmission, as opposed to unidirectional power transmission, from the base plate 18 to the IEC in the inner assembly 100 as well as from the inner assembly 100 to the TEC provided in the base or container support of the water tank 10.

Since the pet water dispenser according may be capable of bi-directional power transmission, an arrangement of the IEC and the TEC is not limited to the inner assembly 100 and the base plate 18. For example, certain sensors illustrated as being part of the TEC (e.g., the proximity sensor 87 or the thermoelectric element 81) may be provided in the inner assembly 100, while certain elements in the IEC (e.g., the auxiliary battery B or the controller C) may be provided in the base of the water tank 10. Each of the electronic devices may be arranged without limitation in a position where function and efficiency may be maximized.

Figure 4:
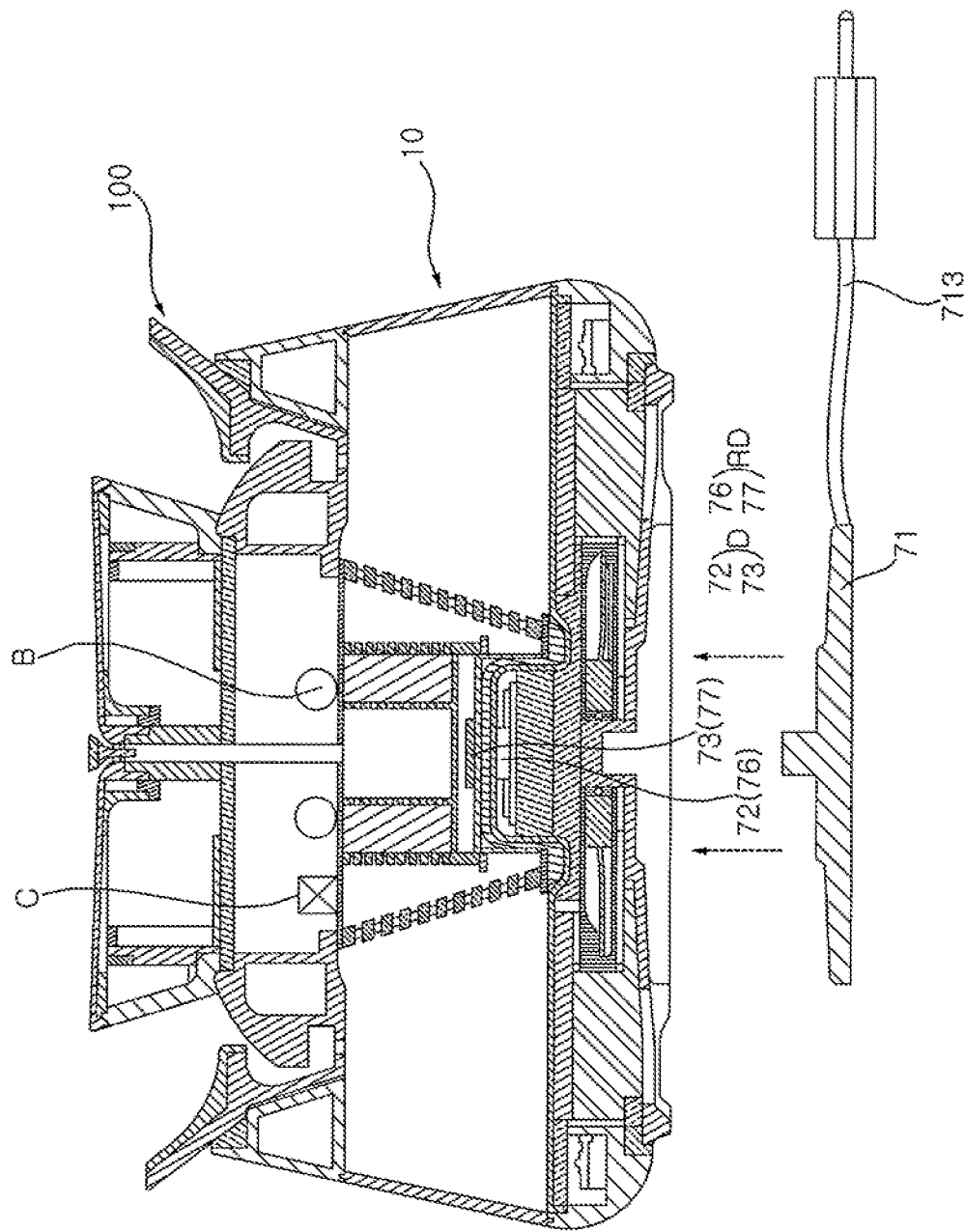
FIG. 4 is a sectional view of a pet water dispenser in which the docking station is separated.

A bidirectional power transmission may be possible even when the docking station 71 is disconnected and external power is not transmitted due to the auxiliary battery B. FIG. 4 shows the docking station 71 decoupled from the base plate 18.

The auxiliary battery B may be provided in the inner assembly 100, and may charge or discharge. In this specification, "discharge" of the auxiliary battery B does not mean that all the electric power charged in the auxiliary battery B is depleted, but rather that at least some power is transmitted from the auxiliary battery B to the IEC or to a reverse wireless power transmission device RD. During a downward or reverse power transfer, the controller C may use the auxiliary battery B as a power source.

The auxiliary battery B may be electrically connected to the TEC so that the TEC may be operated by electric power supplied from the auxiliary battery B when the auxiliary battery B is discharged. The auxiliary battery B may also transmit power to a reverse wireless power transmission device (RD). As previously described, the auxiliary batter B may also operate the IEC.

The reverse wireless power transfer device RD may include a third wireless power transfer device 77 (e.g., a reverse or second wireless power transmitter or transceiver 77) and a fourth wireless power transfer device 76 (e.g., a reverse or second wireless power receiver or transceiver) to transfer power wirelessly. An operation principle of the reverse wireless power transfer device RD may be substantially the same as an operation of the wireless power transfer device D. For convenience of description, the third and fourth wireless power transfer devices 77 and 76 may be a reverse wireless power transmitter and receiver, respectively. The reverse wireless power transmitter 77 may generate an electromagnetic field, which may induce a current in the reverse wireless power receiver 76.

The reverse wireless power transmitter 77 may be electrically connected to the auxiliary battery B and provided in the inner assembly 100. The reverse wireless power receiver 76 may be arranged below the bottom plate 12 and aligned with the reverse wireless power transmitter 77.

Further, the reverse wireless power transmitter 77 may be provided in a same space as the wireless power receiver 73, and the reverse wireless power receiver 76 may be provided in a same space as the wireless power transmitter 72. However, an arrangement of the reverse wireless power transfer device RD and the wireless power transfer device D is not limited thereto, and can be designed and changed to implement bidirectional power transfer.

Figure 5:
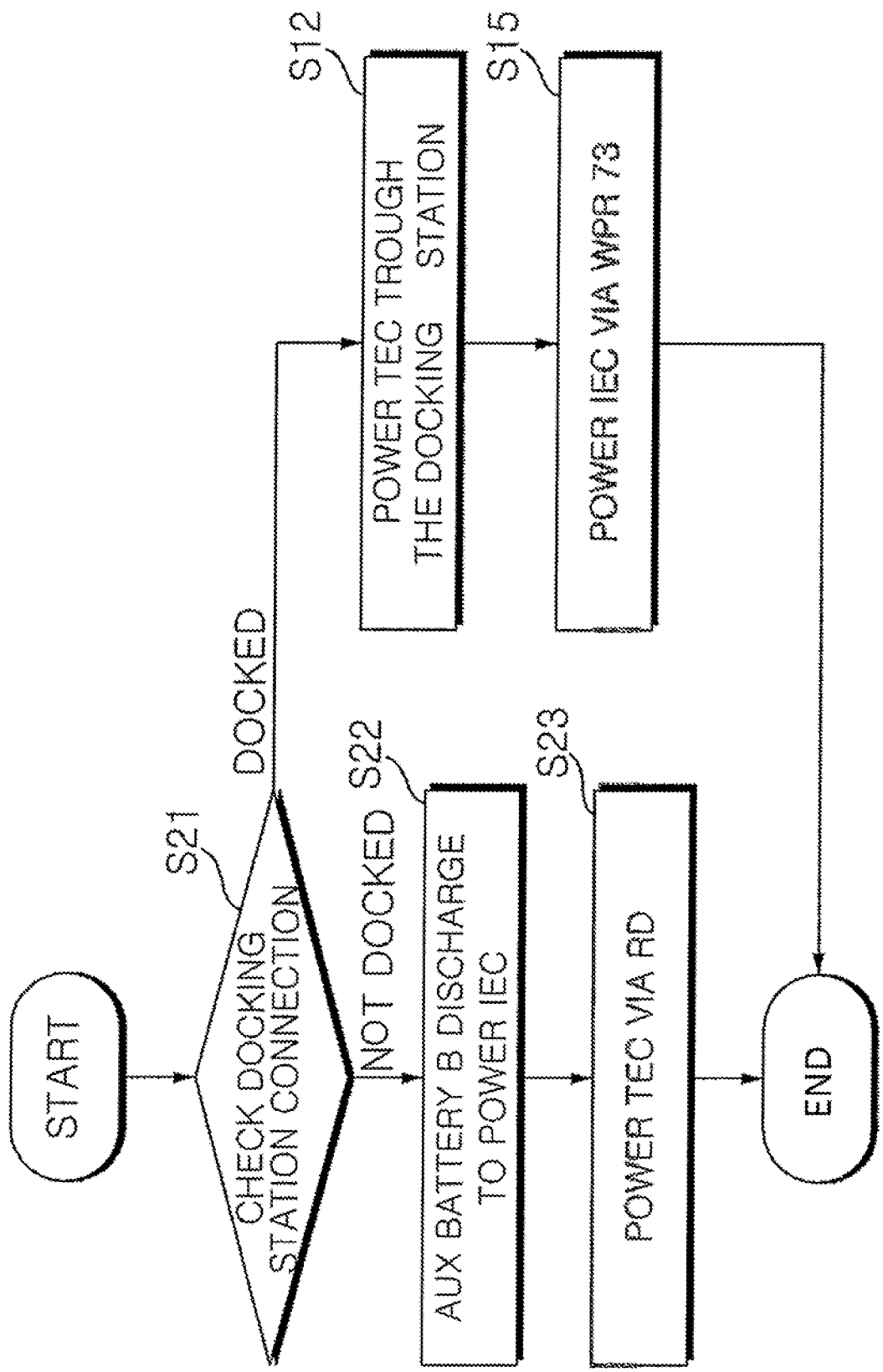
FIG. 5 is a flowchart illustrating a process of the controller selecting a power supply according to connection information of a docking station.

Referring to FIG. 5, in step S21, connection information between the base plate 18 and the docking station 71 may be checked. If the docking station 71 and the base plate 18 are connected, then the docking station 71 may power the TEC (S12) and the wireless power transmitter 72 may transmit power to the wireless power receiver 73 to operate the IEC (S15), as previously described with reference to FIG. 3. However, if the docking station 71 and the base plate 18 are not connected, as in FIG. 4, then, in step S22, the auxiliary battery B may transmit power to the IEC and the reverse wireless power transmitter 77 in step S22. The reverse wireless power transmitter 77 may transmit power to the reverse wireless power receiver 76, and the reverse wireless power receiver 76 may be electrically connected to the TEC. In step S23, power from the reverse wireless power receiver 76 may operate the TEC.

The reverse wireless power transmission by the auxiliary battery B and the reverse wireless power transfer device RD may be controlled by the controller C based on connection information of the docking station 71. The controller C may sense connection information of the docking station 71 and perform reverse wireless power transmission when the controller determines that the docking station 71 or the wire 713 is disconnected and/or the controller C receives a separation signal to indicate that the pet water dispenser is in a "separation state".

The connection information may include information on whether the water tank 10 and the docking station 71 are electrically coupled, and the controller C may determine whether the docking station 71 and the base plate 18 are connected or whether the wire 713 is connected to the docking station 71, and/or may receive a separation signal or a connection signal to determine separation or connection states. The controller C may receive a connection signal when the water tank 10 and the docking station 71 are electrically coupled such that power is supplied by the external power supply, and may further determine that the pet water dispenser is in a "connection state". The controller C may receive a separation signal when the water tank 10 and the docking station 71 are not electrically coupled, or when an external power supply has been disconnected from the docking station 71 (by, e.g., a disconnection of the wire 713), and may further determine that the pet water dispenser is in a "separation state".

The controller C may sense the connection information by measuring a first sensing current I1 transmitted from the wireless power transmitter 72 to the wireless power receiver 73 when the wireless power transmitter is electrically connected to the docking station 71. A first test power amount, current, or signal may be transmitted from the docking station 71 to the wireless power transmitter 72 to ensure a risk of shock is low when external power is supplied by the docking station 71.

The first test signal transmitted to the wireless power transmitter 72 may then be transmitted to the wireless power receiver 73, and the controller C may receive the first test signal from the wireless power receiver 73 and determine the connection information by measuring the first sensing current I1.

The controller C may convert the connection information into the separation signal if the first sensing current I1 is less than the a predetermined first reference current Is1. If the first sensing current I1 is less than the predetermined first reference current Is1, the controller C may determine that there is little or no external power applied to the docking station 71 or that the docking station 71 has been disconnected from the base plate 18. The controller C may further determine that the pet water dispenser is in the connection state.

The controller C may convert the connection information into the connection signal if the first sensing current I1 is equal to or greater than the first predetermined reference current Is1. If the first sensing current I1 is greater than or equal to the first predetermined reference current Is1, the controller C may determine that the docking station 71 and the base plate 18 are electrically and perfectly coupled and that external power is being applied properly to the docking station 71. The controller C may further determine that the pet water dispenser is in the separation state.

When the controller C determines, based on the connection information, that the pet water dispenser is in the connection state, the controller C may charge the auxiliary battery B and use power from the docking station 71 to operate the TEC and power from the wireless power receiver 73 to operate the IEC. When the controller C determines, based on the connection information, that the pet water dispenser is in the separation state, the controller C may discharge the auxiliary battery B to operate both the TEC and the IEC. An operation of the controller C will be described in more detail with reference to FIG. 7.

Figure 6:
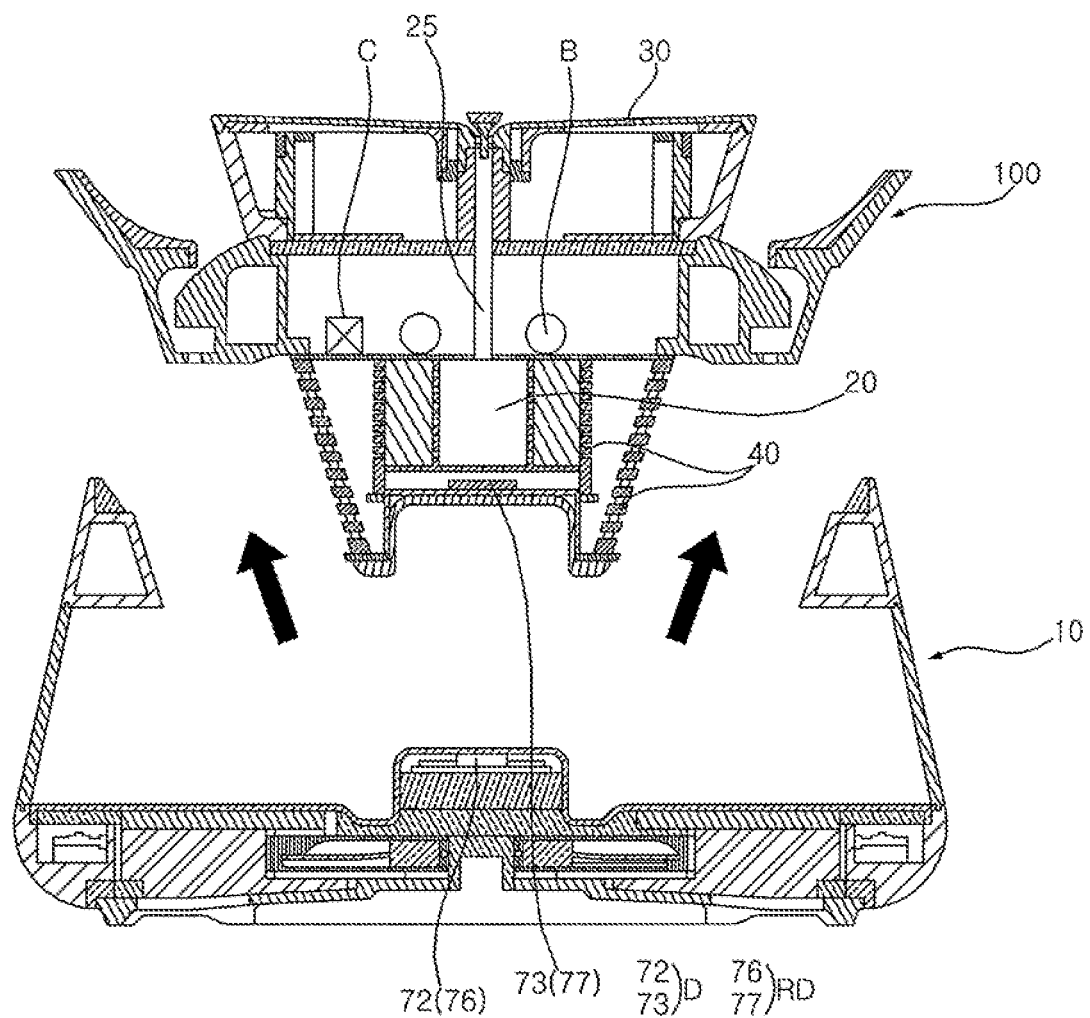
FIG. 6 is a cross-sectional view showing the separation of a water tank and an inner assembly of the pet water dispenser.

Referring to FIG. 6, when the user lifts the inner assembly 100, the inner assembly 100 may be separated from the water tank 10. When the inner assembly 100 is inserted into the water tank 10, the inner assembly 100 and the water tank 10 may be combined. The user may remove the inner assembly 100 from the water tank 10 to exchange or replace the water stored in the water tank 10 or to repair the water tank 10 and/or the inner assembly 100. The pump 20, the water supply pipe 25, the water supply plate 30, and the filter assembly 40 may be combined to form a single inner assembly 100. The water supply plate 30 may be configured to be removable from the inner assembly 100. The water supply plate 30 may be lifted up and removed to be cleaned, repaired, or swapped with another water supply plate 30 having a different height, shape, angle of inclination, material, etc.

The controller C may also be able to determine when the inner assembly 100 is connected to the water tank 10, and control the discharge of the auxiliary battery B based on such combination information. When the inner assembly 100 is disassembled for maintenance or repair, it is possible to prevent a user from electric shock by restricting a discharge of the auxiliary battery B.

The controller C may be able to distinguish between a case where the docking station 71 is disconnected from the water tank 10 or when external power is cut off (based on connection information), and a case where the inner assembly 100 is decoupled from the water tank 10 (based on combination information). The controller C may restrict discharge of the auxiliary battery B in the latter case to prevent electric shock.

When the water tank 10 and the inner assembly 100 are combined but the docking station 71 is disconnected, the auxiliary battery B may be discharged to operate the IEC and the TEC. On the contrary, if the water tank 10 and the inner assembly 100 are separated, the discharge of the auxiliary battery B is restricted.

Figure 7:
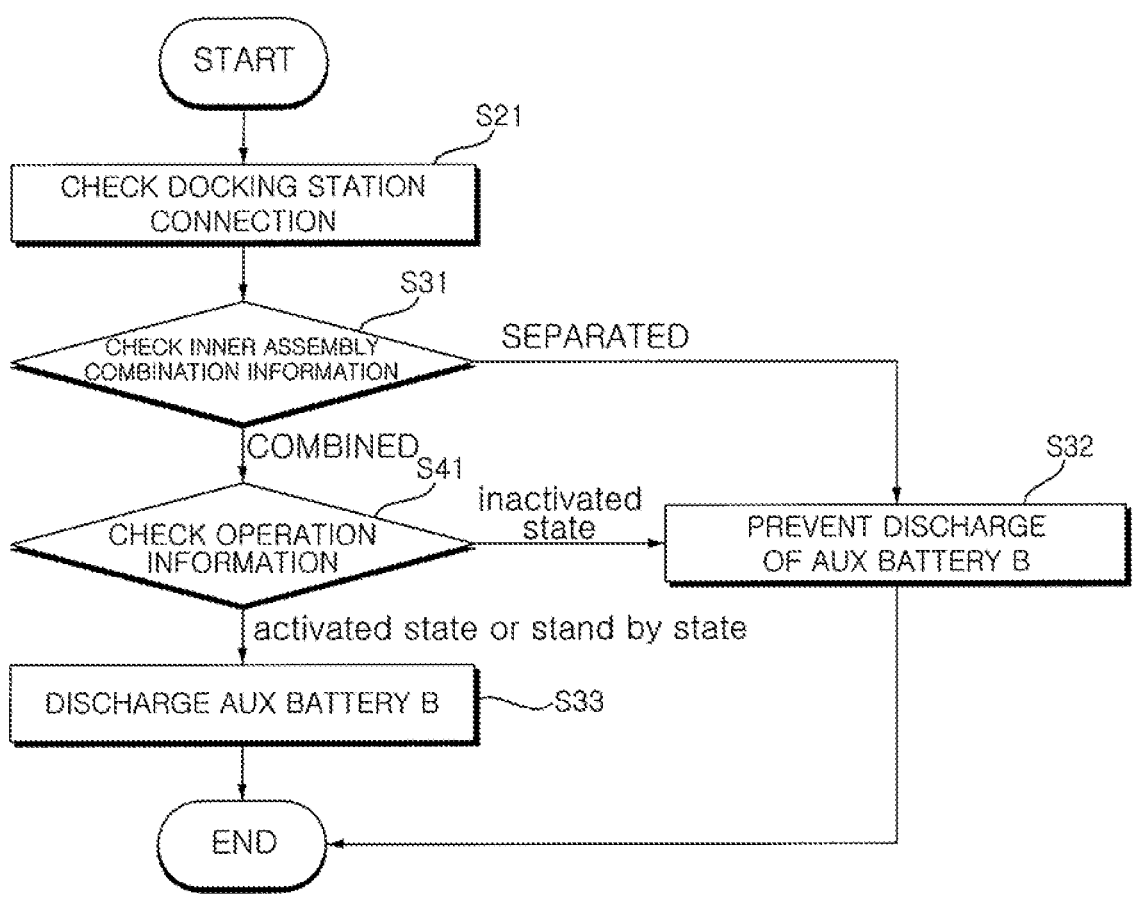
FIG. 7 is a flowchart showing a process of controlling a discharge of an auxiliary battery according to coupling information of the inner assembly.

Referring to FIG. 7, the controller C may sense combination information of the water tank 10 and the inner assembly 100, and determine whether the pet water dispenser is in a "combined state" when the inner assembly 100 is inserted into the water tank 10 or whether the pet water dispenser is in a "decoupled state" when the inner assembly 100 is separated from the water tank 10. First, in step S21, the controller C may check whether the docking station 71 is connected to the base plate 18 via the first sensing current I1 in the process described with reference to FIGS. 4-5.

The controller C may then sense combination information between the water tank 10 and the inner assembly 100 in step S31 by measuring a second sensing current I2 transmitted through the reverse wireless power transfer device RD and the wireless power transfer device D. The reverse wireless power receiver 76 and the wireless power transmitter 72 may be electrically connected, and the reverse wireless power transmitter 77 and the wireless power receiver 73 may also be electrically connected. Thus, the controller C, the auxiliary battery B, the wireless power transfer device D and the reverse wireless power transfer device RD may form a connected closed circuit.

The controller C may transmit a second test power first amount, current, or signal to the reverse wireless power transfer device RD to such a small extent that it does not interfere with or cause an electric shock from the auxiliary battery B. The wireless power transfer device D may receive the second test signal from the reverse wireless power transfer device RD, and the controller C may receive the second test signal from the wireless power receiver 73. The controller C may then measure the second sensing current I2 to determine the combination information.

The controller C may convert the combination information to a decoupling signal if the second sensing current I2 is less than a second predetermined reference current Is2. If the second sensing current I2 is less than the second predetermined reference current Is2, the controller C may determine that the inner assembly 100 and the water tank 10 are separated or not completed connected, and may further determine that the pet water dispenser is in a decoupled state.

If the controller C determines in step S31 that the pet water assembly is in a decoupled state, in step S32, the controller C may limit the discharge of the auxiliary battery B to prevent electric shock to the user. The controller C may prevent the auxiliary battery B from discharging in step S32.

If the second sensing current I2 is equal to or greater than the second predetermined reference current Is2, the controller may convert the combination information to a combination signal. If the second sensing current I2 is higher than the second predetermined reference current Is2, the controller C may determine that the inner assembly 100 and the water tank 10 are coupled, and further determine that the pet water dispenser is in the combined or coupled state.

If the controller C in step S31 determines that the pet water dispenser is in the combined or coupled state, in step S41, the controller C may further check operation information described later. Then, in step S33, the controller C may discharge the auxiliary battery B for operation of the IEC and TEC. An amount of discharge of the auxiliary batter B may be determined based on the operation information from step S41.

The pet water dispenser according to an embodiment may determine connection information and combination information using the first sensing current I1 and the second sensing current I2. There is no need for a separate sensing structure or device to sense the connection information and the combination information, simplifying a structure. Since information is acquired by using a current, the controller C may quickly determine a connection or coupling state of the pet water dispenser. Since a relatively small amount of power is used to acquire the connection and combination information, power management of the auxiliary battery B can be carried out easily.

The controller C may further control a discharge of the auxiliary battery B according to operation information, thereby customizing power consumption based on different uses or states of the pet water dispenser. The power of the auxiliary battery B may be efficiently utilized.

In step S41, the controller C may further determine operation information based on a power supply sensor 90. Operation information may be designated by the user via a user interface provided on the container support 11b of the water tank 10 or based on the sensors (e.g., whether a pet is approaching the pet water dispenser based on the proximity sensor 87). Operation information may include an activated state, a standby state, and an inactivated state. In the activated state, the auxiliary battery B may be discharged. In the standby state, the auxiliary battery B may be discharged by a lesser amount than in the activated state, and may require a further condition (such as pet proximity) to continue to discharge the auxiliary battery B. In the inactivated state, discharge of the auxiliary battery B may be limited or prevented. Operation information may further depend on a connection state of the docking station 71 and the water tank 10. If the pet water dispenser is in a connected state, then discharge of the auxiliary battery B may be limited, as the pet water dispenser may be powered primarily by external power and the wireless power transmission device D.

If a user specifies that the pet water dispenser is in an activated state or if the controller determines that a pet is within a predetermined distance range from the proximity sensor 87 in a standby state, the controller C may proceed to step S33 and discharge the auxiliary battery B. If the user specifies that the pet water dispenser is in an inactivated state, if the controller determines that a pet is not within the predetermined distance range from the proximity sensor 87 in the standby state, or if the controller C determines that the pet water dispenser is in a connected state based on the first sensing current I1 (where external power is applied to the pet water dispenser), the controller C may proceed to step S32 and limit discharge of the auxiliary battery B such that the external power from the external power supply operates the pet water dispenser (i.e., in a normal operation).

The user may specify the operation information by using the power supply sensor 90. The operation information may include an activation signal indicating an activated state of the pet water dispenser, a standby signal indicating a standby state of the pet water dispenser, and an inactivated signal indicating an inactivated state of the pet water dispenser.

Upon receiving the operation signal from the power supply sensor 90, the controller C may discharge the auxiliary battery B without any additional condition to supply power to the IEC and the TEC of the inner assembly 100 and the base of the water tank 10. Upon receiving the inactivated signal, the controller C may limit the discharge of the auxiliary battery B, thus deactivating the IEC and the TEC.

Upon receiving the standby signal, the controller may supply standby (i.e. a small amount of) power from the auxiliary battery B to the TEC and the IEC, and may wait to activate or operate the TEC or IEC based on proximity information of the pet sensed by the proximity sensor 87. The standby power may be a power amount that is lower than an amount of an operating power used to operate the TEC and the IEC, and the standby power may be large enough amount to maintain the TEC and the IEC in a standby state before activation (i.e., a state where the TEC and IEC may be ready to operate quickly after a condition is met).

The controller C may supply the operating power when the controller C determines, based on the proximity information sensed by the proximity sensor 87, that a pet is approaching the pet water dispenser in a predetermined distance range. When the controller C determines that a pet is no longer approaching and/or present within the predetermined distance range, the controller C may supply the standby power again.

A discharge amount of the auxiliary battery B may be controlled based on whether a pet is using the pet water dispenser so that the power of the auxiliary battery B may be used efficiently. The controller C may also prevent the discharge of the auxiliary battery B if the external power is supplied through the docking station.

Figure 8:
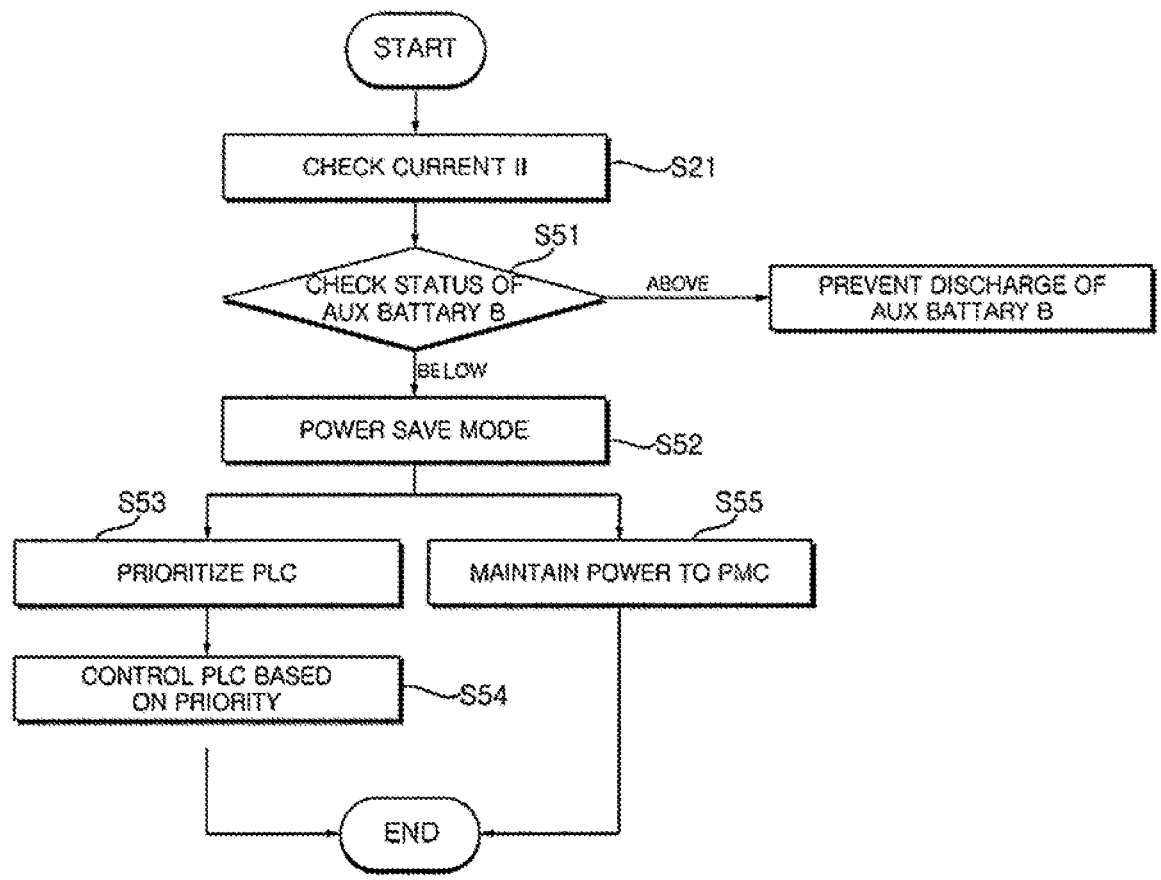
FIG. 8 is a graph showing the relationship between a charging rate of the auxiliary battery and a charging rate of the auxiliary battery, and a process of limiting a power supply.

Referring to FIG. 8, the pet water dispenser may control a discharge of the auxiliary battery B based on a charging rate or charge amount of the auxiliary battery B. In step S21, the controller C may determine connection information between the docking station 71 and the water tank 10. If the controller C determines in step S21 that the pet water dispenser is in the disconnected state, the controller C may proceed to measure a charging rate (or alternatively, a charge amount) of the auxiliary battery B in step S51, and may enter a power saving mode (step S52) when the charging rate is less than a predetermined reference charging rate, which may be designated by the user and changed after designation. Alternatively, the controller C may measure a charge amount of the auxiliary battery B in step S51, and may enter a power saving mode (step S52) when the charge amount is less than a predetermined reference charge amount, which may be designated by the user and changed after designation. When the controller measures a charge rate or charge amount equal to or greater than the predetermined reference charge rate or amount, the controller C may carry out an operation as in FIG. 7, limiting a discharge of the auxiliary battery B in step S32 if the inner assembly 100 is decoupled from the water tank 10.

However, if the charging rate or charge amount is less than the predetermined reference charge rate or amount, the controller C may enter the power saving mode in step S52. In the power saving mode, the controller C may limit the power supplied to at least one of the TEC and the IEC by the auxiliary battery B. In the power-saving mode, the controller C may first classify the plurality of electronic components or devices in the TEC and/or IEC into power-maintaining components (PMC) and power-limiting components (PLC) (step S52).

Power-maintaining components may be electronic devices that continue to receive power during the power saving mode, such as the pump 20 and the wireless power transmitter and receiver 72 and 73. Power-limiting components may be electronic devices that receive limited or no power during the power saving mode, such as the proximity sensor 87 and the thermoelectric element 81. The classification of "power-maintaining devices" may also be referred to as "first devices" while the classification of "power-limiting devices" may also be referred to as "second devices." The controller C may then proceed to selectively operate electronic devices of the pet water dispenser according to importance and necessity. The user may also classify first and second devices via a user interface or input module provided on the container support 11b.

The controller C may maintain power supply to the power-maintaining components in step S55. In step S53, the controller C may order the power-limiting components in order of power consumption or priority. The controller C may reclassify the power-limiting devices by taking into consideration the power usage and the functional importance of each device and place the electronic devices classified as "power-limiting" in a "power limitation" order, and in step S54, the controller may control or prioritize power supply in order of the power limitation order determined in step S53. In addition, the user may rearrange the power limitation order, and the controller C may control an operation of the pet water dispenser according to the user's selected power limitation order in step S54.

This application is related to U.S. application Ser. No. 16/571,245 filed on Sep. 16, 2019, U.S. application Ser. No. 16/571,093 filed on Sep. 14, 2019, U.S. application Ser. No. 16/571,090 filed on Sep. 14, 2019, U.S. application Ser. No. 16/571,089 filed on Sep. 14, 2019, U.S. application Ser. No. 16/571,076 filed on Sep. 14, 2019, U.S. application Ser. No. 16/571,074 filed on Sep. 14, 2019, U.S. application Ser. No. 16/571,073 filed on Sep. 14, 2019, U.S. application Ser. No. 16/570,310 filed on Sep. 13, 2019, U.S. application Ser. No. 16/570,279 filed on Sep. 13, 2019, U.S. application Ser. No. 16/569,827 filed on Sep. 13, 2019, U.S. application Ser. No. 16/659,841, filed on Sep. 13, 2019, and U.S. application Ser. No. 16/569,908 filed on Sep. 13, 2019, the entire contents of which are incorporated by reference herein.

Further, the following Korean Applications are also incorporated herein by reference: 10-2018-0122992 filed on Oct. 16, 2018; 10-2018-0123552 and 10-2018-0123553 filed on Oct. 17, 2018; 10-2018-0131037 filed on Oct. 30, 2018; 10-2018-0131405 filed on Oct. 31, 2018; 10-2019-0059513 and 10-2019-0059514 filed on May 21, 2019; 10-2018-0133062 filed on Nov. 1, 2018; 10-2019-0059787 filed on May 22, 2019; 10-2019-0060918, 10-2019-0060919, and 10-2019-0060920 filed on May 24, 2019; and 10-2019-0080603 and 10-2019-0080604 filed on Jul. 4, 2019.

Embodiments disclosed herein may be implemented as a liquid dispenser that supplies drinking water to an animal such as a pet. However, embodiments disclosed herein are not limited to pets. For example, the liquid dispenser may be used in a zoo to supply drinking water to animals kept in a zoo, research areas, wildlife preservation areas, etc.

Embodiments disclosed herein may be implemented as a pet water dispenser capable of bidirectional power supply between a water tank or base of a water tank and an inner assembly, maximizing possibilities of positions and functions of electronic components or devices.

The pet water dispenser may implement a method for controlling electric power by based on an application of external electric power and an external situation, and may distinguish between a case when the external electric power is unintentionally cut off and a case where the external electric power is purposefully cut off for repair or maintenance. The pet water dispenser may vary power supply to components or devices according to a charging rate or amount of an auxiliary battery or battery. The pet water dispenser may solve all the problems that may be caused or predicted from the related art, in addition to the technical problems described above.

A pet water dispenser may include a power supply capable of bi-directional wireless power transfer between a water tank and an inner assembly located within the water tank. The power supply may include a docking station, a secondary or auxiliary battery, a wireless power transfer device, a reverse wireless power transfer device, and a control unit or controller.

The docking station may be provided below a bottom plate of the water tank, and external power may be applied thereto. The auxiliary battery may be accommodated in the inner assembly. The reverse wireless power transmission device may be electrically connected or coupled to the auxiliary battery and a water tank electronic component or chamber or base electronic component or chamber provided under the water tank in a base and using electric power, respectively. The controller may sense connection information of the docking station and supply power from the auxiliary battery to the water tank electronic component through the reverse wireless power transmission device when the connection information includes a separation signal indicating a separation state.

The inner assembly may further include an inner electronic component or chamber that consumes power. The wireless power transmission device may further include a wireless power transmitter and a wireless power receiver to supply power from the docking station to the inner electronic component. The reverse wireless power transmission device may include a reverse wireless power transmitter and a reverse wireless power receiver. The reverse wireless power transmitter may be provided in the inner assembly, and the reverse wireless power receiver may be provided below the bottom plate. The reverse wireless power receiver and the reverse wireless power transmitter may be aligned to correspond to each other.

The wireless power transfer device may include a wireless power transmission unit or transmitter and a wireless power receiver or receiving unit. The wireless power transmitter may be provided below the bottom plate, and the wireless power receiver may be provided within the inner assembly. The wireless power receiver and the wireless power transmitter may be aligned to correspond to each other.

The controller may sense connection information by measuring a first sensing current transmitted from the wireless power transmitter connected to the docking station to the wireless power receiver. The controller may interpret the connection information as a separation signal when the first sensing current is less than a first reference or predetermined current. If the first sensing current is equal to or greater than the first reference current, the connection information may be interpreted as a connection signal indicating a connection state.

Embodiments disclosed herein may include a power supply of a pet water dispenser may include a docking station, a secondary or auxiliary battery, and a control unit or controller. The control unit may detect coupling information of a water tank and an inner assembly based on a separation or decoupling signal of the docking station and may discharge the auxiliary battery when the coupling information includes a coupling signal indicating a coupling state of the pet water dispenser.

The power supply may further include a wireless power transmission or transfer device. The wireless power transmission device may include a wireless power transmission unit or transmitter and a wireless power reception unit or receiver. The wireless power transmission unit may be provided below a bottom plate, and the wireless power receiving unit may be provided within the inner assembly. The wireless power receiving unit and the wireless power transmitting unit may be aligned to correspond to each other.

The power supply may further include a reverse wireless power transfer device. The reverse wireless power transfer device may include a reverse wireless power transmission unit or transmitter and a reverse wireless power reception unit or receiver. The reverse wireless power transmission unit may be provided in the inner assembly, and the reverse wireless power reception unit may be provided below the bottom plate. The reverse wireless power reception unit and the reverse wireless power transmitting unit may be aligned to correspond to each other.

The reverse wireless power transmission unit may be electrically connected or coupled to the auxiliary battery. The reverse wireless power reception unit may be electrically connected or coupled to the wireless power transmission unit.

The controller may sense coupling or combination information by measuring a second sensing current transmitted through the reverse wireless power transmission device and the wireless power transmission device connected to the auxiliary battery.

If the second sensing current is less than a second reference or predetermined current, the controller may interpret the combination information as a separation signal indicating a separation state between the water tank and the inner assembly. If the second sensing current is equal to or greater than the second reference current, the combining information may be interpreted as the combining signal indicating a coupling state between the water tank and the water assembly. The controller may limit the discharge of the auxiliary battery when the combination information includes the separation signal.

The controller may sense operation information based on the combination signal or other operation information. When the operation information includes an operation, activation, or actuated signal and a standby signal, the auxiliary battery discharge can be maintained. When the operation information includes an unactivated, unactuated, or inactivated signal, the auxiliary battery discharge can be limited.

An activation signal may immediately activate the inner assembly. The standby signal may conditionally activate the inner assembly. The inactivated signal may deactivate the inner assembly. The controller may supply operating power from the auxiliary battery when the operation information includes an operation or activated signal. When the operation information includes a standby signal, standby power can be supplied from the auxiliary battery. The operating power may be greater than the standby power.

Embodiments disclosed herein may include a power supply of the pet water dispenser may include an auxiliary battery, a reverse wireless power transmitter, and a reverse wireless power receiver. The reverse wireless power transmitter may be electrically connected or coupled to the auxiliary battery. The reverse wireless power receiver may be provided below the bottom plate of the water tank or tub.

A water tank electronic component or chamber may be provided below the bottom plate and use electric power. An inner electronic component or chamber may be accommodated in the inner assembly and use electric power. The power supply may further include a control unit or controller. The control unit may measure a charging rate or amount of the auxiliary battery.

When the charging rate or amount is less than a reference charging rate or amount, a power saving mode may be entered, and power to be supplied to at least one of the electronic components or devices (i.e., in the water tank electronic component and/or in the inner electronic component) may be limited. The control unit may classify the plurality of electronic parts, components, or devices into power-maintaining parts, components, or devices and power-limiting parts, components, or devices.

The control unit may limit the power supply to the power limiting components in the power saving mode, and maintain the power supply to the power maintaining components. The control unit may reclassify the power limiting components in order of power limitation.

Embodiments disclosed herein may include a bi-directional power supply between a water tank and an inner assembly, including a secondary or auxiliary battery and a reverse wireless power transfer device. Therefore, water tank electronic components can be arranged in the water tank or in the inner assembly. Furthermore, the water tank electronic components can be operated without external power, so that the usability can be improved without limitation of function.

The pet water dispenser may detect coupling or combination information of the inner assembly and the water tank to control a discharge of the auxiliary battery, thereby preventing electric shock when the inner assembly is separated from the water tank for repair or cleaning. The pet water dispenser may efficiently use the power of the auxiliary battery by controlling the electric power supply according to the charging rate or amount of the auxiliary battery.

Embodiments disclosed herein may be implemented as a liquid dispenser including a tank including a bottom and a wall extending upward from the bottom, a base provided below the bottom of the tank, at least one first electronic device provided in the base and operated via electrical power, an inner assembly that may be removable from the tank, the inner assembly having an outlet for dispensing liquid from the tank, and a power supply assembly to supply power to the at least one first electronic device. The power supply assembly may include a docking station configured to receive external power, the docking station being provided below the base, a battery provided in the inner assembly, a first wireless power transfer device electrically coupled to the battery, and a controller configured to determine whether the docking station may be connected to the base and may be receiving external power. When the docking station is not connected to the base or not receiving external power, the controller may control the battery to supply power to the first electronic device via the first wireless power transfer device.

At least one second electronic device may be provided in the inner assembly and operated via electrical power. The inner assembly may be provided above the base when the inner assembly may be coupled to the tank. A second wireless power transfer device may be included in the power supply assembly to supply power from the docking station to the at least one second electronic device.

The first wireless power transfer device may include a first wireless power transmitter provided in the inner assembly and a first wireless power receiver provided in the base of the tank at a position aligning with a position of the first wireless power transmitter. The second wireless power transfer device may include a second wireless power transmitter provided between the inner and outer bottoms of the tank and a second wireless power receiver provided in the inner assembly at a position aligning with a position of the second wireless power transmitter. The first wireless power transmitter may be connected to the docking station, and the controller may measure a sensing current transmitted from the first wireless power transmitter to the first wireless power receiver to sense whether the docking station may be connected to the base and receiving external power.

The controller may determine that the docking station may be not connected to the base or may be not receiving external power when the sensing current is less than a predetermined reference current. The controller may determine that the docking station may be connected to the base and may be receiving external power if the sensing current is equal to or greater than the predetermined reference current.

Embodiments disclosed herein may be implemented as a liquid dispenser including a tank including a bottom, an inner assembly that may be removable from the tank, the inner assembly having an outlet for dispensing liquid from the tank, and a power supply assembly to supply power to the inner assembly. The power supply assembly may include a docking station configured to receive power from an external power source, the docking station being provided below the bottom of the tank, a battery provided in the inner assembly, and a controller configured to determine whether the tank and the inner assembly may be coupled. When the controller determines that the inner assembly and the tank are not coupled to each other, the controller may limit a discharge of the battery.

The power supply assembly further may include a first wireless power transfer device, the first wireless power transfer device including a first wireless power transmitter provided in a base below the bottom of the tank and a first wireless power receiver provided in the inner assembly at a position aligning with a position of the first wireless power transmitter. The power supply assembly further may include a second wireless power transfer device, the second wireless power transfer device including a second wireless power transmitter provided in the inner assembly and a second wireless power receiver provided in the base of the tank at a position aligning with the second wireless power transmitter.

The second wireless power transmitter and the first wireless power receiver may be electrically connected or coupled to the battery. The second wireless power receiver may be electrically connected or coupled to the first wireless power transmitter. The controller may measure a sensing current transmitted through the second wireless power transmitter and the first wireless power transmitter to determine whether the tank and the inner assembly are coupled. The controller may determine that the inner assembly and the tank are not coupled if the sensing current is less than a predetermined reference current and may determine that the inner assembly and the tank are coupled if the sensing current is equal to or greater than the predetermined reference current.

At least one electronic device may be included. When the controller determines that the inner assembly and the tank are coupled, and also determines that the docking station is not receiving external power, the controller discharges the battery to provide power to the at least one electronic device. The controller may further detect operation information based on a received activation signal, standby signal, or inactivation signal. The controller may discharge the battery upon receiving the activation signal or the standby signal, and may limit a discharge of the battery upon receiving the inactivation signal.

The controller may discharge the battery upon receiving the activation signal to power at least one electronic device provided in at least one of the inner assembly or below the bottom of the tank. The controller may discharge the battery upon receiving the standby signal to prepare to power the at least one electronic device if another condition may be met, and may limit discharge of the battery upon receiving the inactivation signal. The controller may discharge the battery by a first amount upon receiving the activation signal. The controller may discharge the battery by a second amount less than the first amount upon receiving the standby signal.

Embodiments disclosed herein may be implemented as a liquid dispenser, including a tank including a bottom, a base provided below the bottom of the tank, an inner assembly that may be removable from the tank, the inner assembly having an outlet for dispensing liquid from the tank, and, a power supply assembly to supply power. The power supply assembly may include a battery provided in the inner assembly, a first wireless power transmitter electrically connected or coupled to the battery and provided in the inner assembly, and a first wireless power receiver provided in the base.

A plurality of electronic devices may be included. At least one electronic device of the plurality of electronic devices may be provided in the base of the tank or in the inner assembly. A controller may control the power supply assembly. The controller may measure a charge of the battery and enter a power saving mode when the charge may be less than a predetermined reference charge, and may limit power supplied from the battery to at least one of the plurality of electronic devices in the power saving mode.

In the power saving mode, the controller may classify each of the electronic devices in the plurality of electronic devices as a first device or a second device, and may continue to supply power to each electronic device classified as a first device but may limit power supplied to each electronic device classified as a second device. The controller may order the electronic devices classified as second devices into a power limitation order, and may prioritize power supplied to the electronic devices classified as second devices according to the power limitation order.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element (s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A liquid dispenser, including:
a tank including a bottom, and a wall extending upward from the bottom;
a base provided below the bottom of the tank;
at least one first electronic device provided in the base and operated via electrical power;
an inner assembly that is removable from the tank, the inner assembly having an outlet for dispensing liquid from the tank, the outlet being provided above an upper end of the tank;
a power supply assembly to supply power to the at least one first electronic device, the power supply assembly including:
a docking station configured to receive external power, the docking station being provided below the base,
a battery provided in the inner assembly,
a first wireless power transfer device electrically coupled to the battery, and
a controller configured to determine whether the docking station is connected to the base and is receiving external power, wherein, when the docking station is not connected to the base or not receiving external power, the controller controls the battery to supply power to the first electronic device via the first wireless power transfer device;
at least one second electronic device provided in the inner assembly and operated via electrical power, the inner assembly being provided above the base when the inner assembly is coupled to the tank; and
a second wireless power transfer device included in the power supply assembly to supply power from the docking station to the at least one second electronic device.

2. The liquid dispenser of claim 1, wherein the first wireless power transfer device includes a first wireless power transmitter provided in the inner assembly and a first wireless power receiver provided in the base of the tank at a position aligning with a position of the first wireless power transmitter.

3. The liquid dispenser of claim 1, wherein the second wireless power transfer device includes a second wireless power transmitter provided between inner and outer bottoms of the tank and a second wireless power receiver provided in the inner assembly at a position aligning with a position of the second wireless power transmitter.

4. The liquid dispenser of claim 2, wherein the first wireless power transmitter is connected to the docking station, and the controller measures a sensing current transmitted from the first wireless power transmitter to the first wireless power receiver to sense whether the docking station is connected to the base and receiving external power.

5. The liquid dispenser of claim 4, wherein the controller determines that the docking station is not connected to the base or is not receiving external power when the sensing current is less than a predetermined reference current, and the controller determines that the docking station is connected to the base and is receiving external power if the sensing current is equal to or greater than the predetermined reference current.

6. A liquid dispenser, including:
a tank including a bottom;
an inner assembly that is removable from the tank, the inner assembly having an outlet for dispensing liquid from the tank;
a power supply assembly to supply power to the inner assembly, wherein the power supply assembly includes:
a docking station configured to receive power from an external power source, the docking station being provided below the bottom of the tank,
a battery provided in the inner assembly; and
a controller configured to determine whether the tank and the inner assembly are coupled, wherein, when the controller determines that the inner assembly and the tank are not coupled to each other, the controller limits a discharge of the battery,
wherein the power supply assembly further includes a first wireless power transfer device, the first wireless power transfer device including a first wireless power transmitter provided in a base below the bottom of the tank and a first wireless power receiver provided in the inner assembly at a position aligning with a position of the first wireless power transmitter, and
wherein the power supply assembly further includes a second wireless power transfer device, the second wireless power transfer device including a second wireless power transmitter provided in the inner assembly and a second wireless power receiver provided in the base of the tank at a position aligning with the second wireless power transmitter.

7. The liquid dispenser of claim 6, wherein the second wireless power transmitter and the first wireless power receiver are electrically coupled to the battery, and wherein the second wireless power receiver is electrically coupled to the first wireless power transmitter.

8. The liquid dispenser of claim 7, wherein the controller measures a sensing current transmitted through the second wireless power transmitter and the first wireless power transmitter to determine whether the tank and the inner assembly are coupled.

9. The liquid dispenser of claim 8, wherein the controller determines that the inner assembly and the tank are not coupled if the sensing current is less than a predetermined reference current and determines that the inner assembly and the tank are coupled if the sensing current is equal to or greater than the predetermined reference current.

10. The liquid dispenser of claim 9, further including at least one electronic device, and wherein, when the controller determines that the inner assembly and the tank are coupled, and also determines that the docking station is not receiving external power, the controller discharges the battery to provide power to the at least one electronic device.

11. A liquid dispenser, comprising:
a tank including a bottom;
an inner assembly that is removable from the tank, the inner assembly having an outlet for dispensing liquid from the tank;
a power supply assembly to supply power to the inner assembly, wherein the power supply assembly includes:
a docking station configured to receive power from an external power source, the docking station being provided below the bottom of the tank,
a battery provided in the inner assembly; and
a controller configured to determine whether the tank and the inner assembly are coupled, wherein, when the controller determines that the inner assembly and the tank are not coupled to each other, the controller limits a discharge of the battery,
wherein the controller further detects operation information based on a received activation signal, standby signal, or inactivation signal, wherein the controller discharges the battery upon receiving the activation signal or the standby signal, and limits a discharge of the battery upon receiving the inactivation signal.

12. The liquid dispenser of claim 11, wherein the controller discharges the battery upon receiving the activation signal to power at least one electronic device provided in at least one of the inner assembly or below the bottom of the tank, wherein the controller discharges the battery upon receiving the standby signal to prepare to power the at least one electronic device if another condition is met, and limits discharge of the battery upon receiving the inactivation signal.

13. The liquid dispenser of claim 11, wherein the controller discharges the battery by a first amount upon receiving the activation signal, and wherein the controller discharges the battery by a second amount less than the first amount upon receiving the standby signal.

14. A liquid dispenser, including:
a tank including a bottom;
a base provided below the bottom of the tank;
an inner assembly that is removable from the tank, the inner assembly having an outlet for dispensing liquid from the tank, the outlet being provided at an upper end of the inner assembly;
a power supply assembly to supply power, the power supply assembly including:
a battery provided in the inner assembly,
a first wireless power transmitter electrically coupled to the battery and provided in the inner assembly, and,
a first wireless power receiver provided in the base;
a plurality of electronic devices, wherein at least one electronic device of the plurality of electronic devices is provided in the base of the tank or in the inner assembly; and
a controller to control in the power supply assembly, wherein the controller measures a charge of the battery and enters a power saving mode when the charge is less than a predetermined reference charge, and limits power supplied from the battery to at least one of the plurality of electronic devices in the power saving mode.

15. The liquid dispenser of claim 14, wherein, in the power saving mode, the controller classifies each of the electronic devices in the plurality of electronic devices as a first device or a second device, and continues to supply power to each electronic device classified as a first device but limits power supplied to each electronic device classified as a second device.

16. The liquid dispenser of claim 15, wherein the controller orders the electronic devices classified as second devices into a power limitation order, and prioritizes power supplied to the electronic devices classified as second devices according to the power limitation order.

* * * * *